United States Patent [19]
Pulliam

[11] Patent Number: 6,065,766
[45] Date of Patent: May 23, 2000

[54] HITCH LOCK MECHANISM

[76] Inventor: Randall Pulliam, 13790 E. Jefferson Blvd., Mishawaka, Ind. 46545

[21] Appl. No.: 09/173,429

[22] Filed: Oct. 15, 1998

[51] Int. Cl.[7] ....................................................... B60F 3/10
[52] U.S. Cl. ......................... 280/415.1; 280/433; 411/85; 411/553
[58] Field of Search .................................... 280/433, 443, 280/415.1, 495; 248/225.11, 222.52; 403/348, 449, 343; 411/553, 84, 85

[56] References Cited

U.S. PATENT DOCUMENTS

| | | | |
|---|---|---|---|
| 3,848,894 | 11/1974 | Breford | 280/437 |
| 4,871,135 | 10/1989 | Thalenfeld | 248/221.4 |
| 5,445,472 | 8/1995 | Oukouchi | 403/348 |
| 5,593,265 | 1/1997 | Kizer | 411/552 |
| 5,597,260 | 1/1997 | Peterson | 403/319 |
| 5,800,022 | 9/1998 | Del Rosario | 301/5.3 |

*Primary Examiner*—Paul N. Dickson
*Assistant Examiner*—Daniel Yeagley
*Attorney, Agent, or Firm*—Baker & Daniels

[57] ABSTRACT

A securement device used for attaching a hitch to a vehicle bed in which the device includes a bracket secured to a frame part of the vehicle, a support post which is seated upon the bracket and which extends upwardly through the bed and the hitch, a retainer which forms a part of the support post and which upon rotation of the support post relative to the bracket prevents separation of the support post from the bracket, and a keeper part which is secured to the support post and which overlies at least a portion of the hitch to prevent the support post from rotating relative to the bracket and which further serves to prevent the hitch from being removed from the support post.

8 Claims, 10 Drawing Sheets

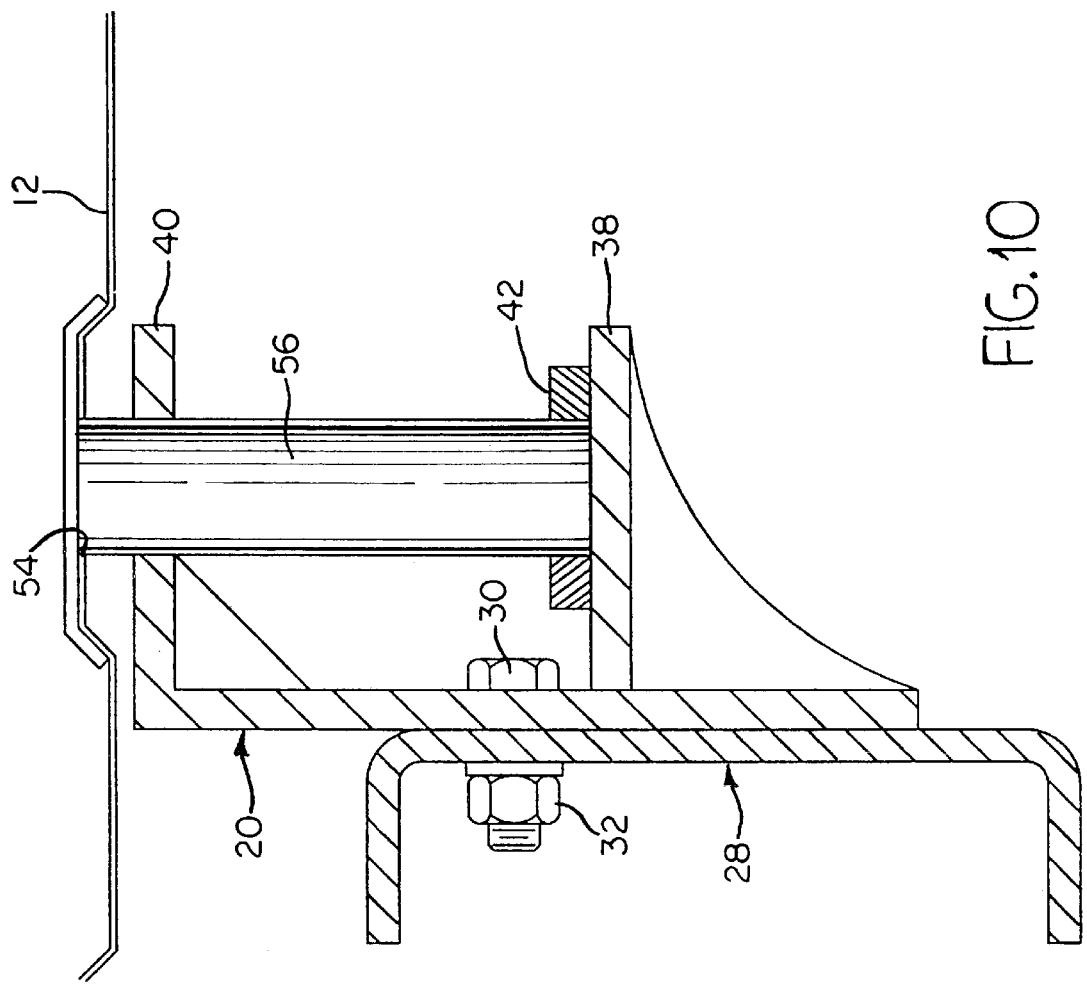

HITCH LOCK MECHANISM

BACKGROUND OF THE INVENTION

In towing trailers or similar vehicles, it is common to mount the hitch mechanism to the bed of the towing vehicle which normally is a pickup truck. Such hitch mechanisms are commonly called fifth wheel hitches. When the truck is not utilized for towing purposes, it is normally desirable to remove the hitch mechanism from the bed of the truck so as to enable the truck to be utilized for other purposes requiring the use of the bed.

Some hitch installations require the use of mounting rails or bars positioned transversely and permanently attached to the upper surface of the bed of the truck. Once the hitch mechanism has been removed, these rails or bars still remain to cause a disruption in the hauling surface for the bed. Further, it can be envisioned that at some time or another the hitch mechanism may have been directly attached to the truck bed such as by bolts extending through the bed. By removing the bolts, the hitch mechanism could be displaced from the truck bed with the bed being unencumbered by any rail. Nevertheless, even under these assumed circumstances, the attachment and removal of the hitch mechanism would be time consuming and rather cumbersome.

The following described invention provides a remedy for the described bed disruption and hitch removal inconvenience by providing a securement device which allows simplified attachment and removal of the hitch mechanism yet still providing a flush disinterrupted truck bed when the hitch mechanism has been removed.

SUMMARY OF THE INVENTION

This invention relates to a securement device which is used for attaching a hitch mechanism to a vehicle and will have specific but not limited application to the attachment of a fifth wheel hitch to a bed of a truck or similar vehicle.

In this invention, the securement device includes a bracket which is secured to the vehicle, preferably to one of its frame members below the bed of the vehicle. A support post is seated upon the bracket with the upper end of the post extending through the vehicle bed and the overlying hitch. The support post is interlocked with the bracket upon rotational movement of the post relative to the bracket thus preventing the withdrawal of the post. A keeper part is secured to the upper end of the support post overlying at least a portion of the hitch. The keeper part interlocks with the hitch so as to prevent rotating movement of the support post relative to the bracket.

Accordingly, it is an object of this invention to provide a securement device which is for attaching a hitch to the bed of a vehicle and which is of simplified operation.

Another object of this invention is to provide a securement device which is for attaching a hitch to the bed of a vehicle and which, when the hitch is detached from the securement device and removed from the bed of the vehicle, the use of the bed will not be disrupted.

Still another object of the invention is to provide a securement device which is used to attach a fifth wheel hitch to a truck bed and which is of simplified, reliable operation.

Other objects of this invention will become apparent upon a reading of the following description.

DESCRIPTION OF THE DRAWINGS

A preferred embodiment of this invention has been chosen for purposes of illustration wherein:

FIG. 10 is a sectional view showing the plug member inserted through the truck bed to close the opening in the truck bed for the support post.

DESCRIPTION OF THE PREFERRED EMBODIMENT

The preferred embodiment illustrated is not intended to be all-inclusive but rather it is to describe the preferred embodiment of the invention and to enable others skilled in the art to best utilize the invention.

Figure 1:
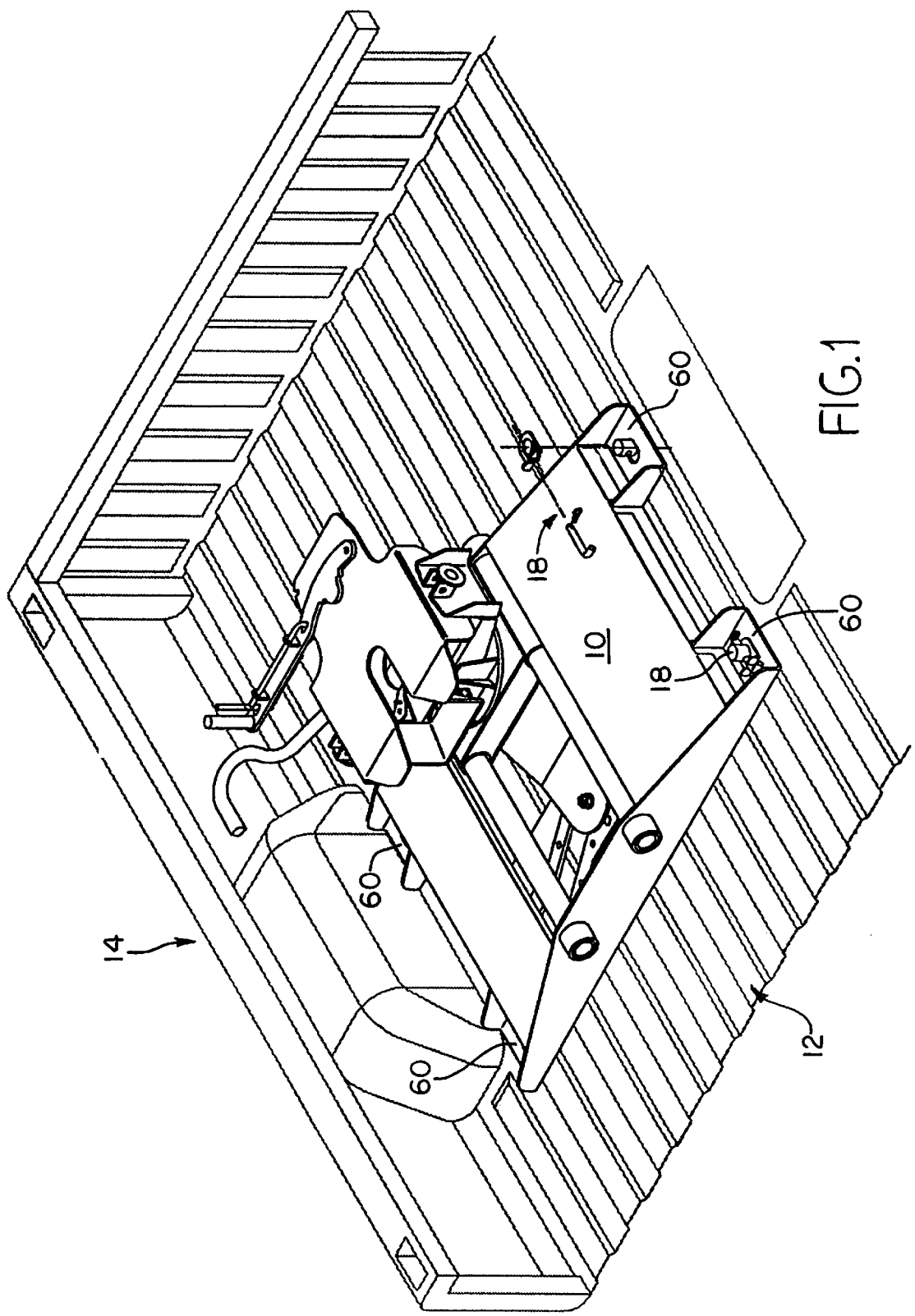
FIG. 1 is a perspective view showing a hitch mechanism mounted to a truck bed, shown in fragmented form, by the securement device of this invention.
Figure 2:
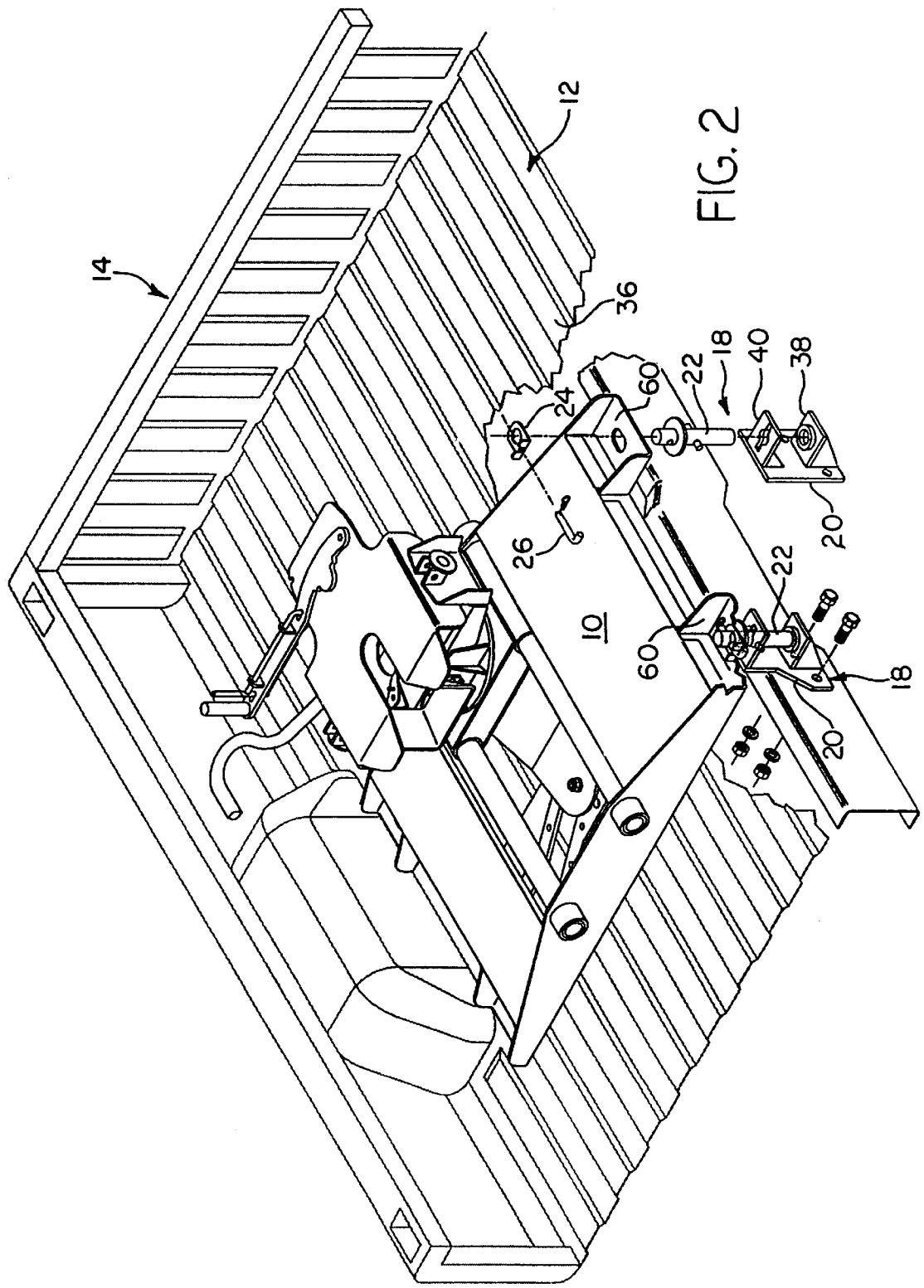
FIG. 2 is a perspective view similar to FIG. 1 but showing a portion of the partial truck bed broken away to illustrate the securement device of this invention being secured to the frame of the vehicle.

Referring first to FIG. 1 of the drawings, a fifth wheel hitch 10 is shown secured to the bed 12 of a pickup truck 14 or similar vehicle. Hitch 10 is secured to bed 12 at its four laterally displaced and longitudinally spaced mounting flanges 60. Each flange 60 is connected to bed 12 by a securement device 18 of this invention.

Each securement device 18 is of the same construction with one such device being described in detail as follows. Each securement device 18 includes as best seen in detail in FIG. 3 a bracket 20, a support post 22, a keeper 24, and a lock pin 26. Each bracket 20 is secured to truck 14 under bed 12 at a frame rail 28. Rails 28 extend longitudinally of truck 14 under bed 12 as is common and serve to support the bed above the roadway through a common wheel and axle assembly (not shown). Bolts 30 and securement nuts 32 along with lock washers 34 extend through accommodating openings in frame rails 28 and serve to secure each bracket 20 to a rail. Bracket 20 extends above its supporting rail 28 and terminates just below floor 36 of bed 12. Bracket 20 includes a lower platform 38 and an upper spaced retainer plate 40. Platform 38 carries an anchor collar 42. Retainer plate 40 has a slot 44 formed in it in the shape of a double key slot.

Support post 22 includes a collar 46 located adjacent to the upper end 23 of the post.

Figure 3:
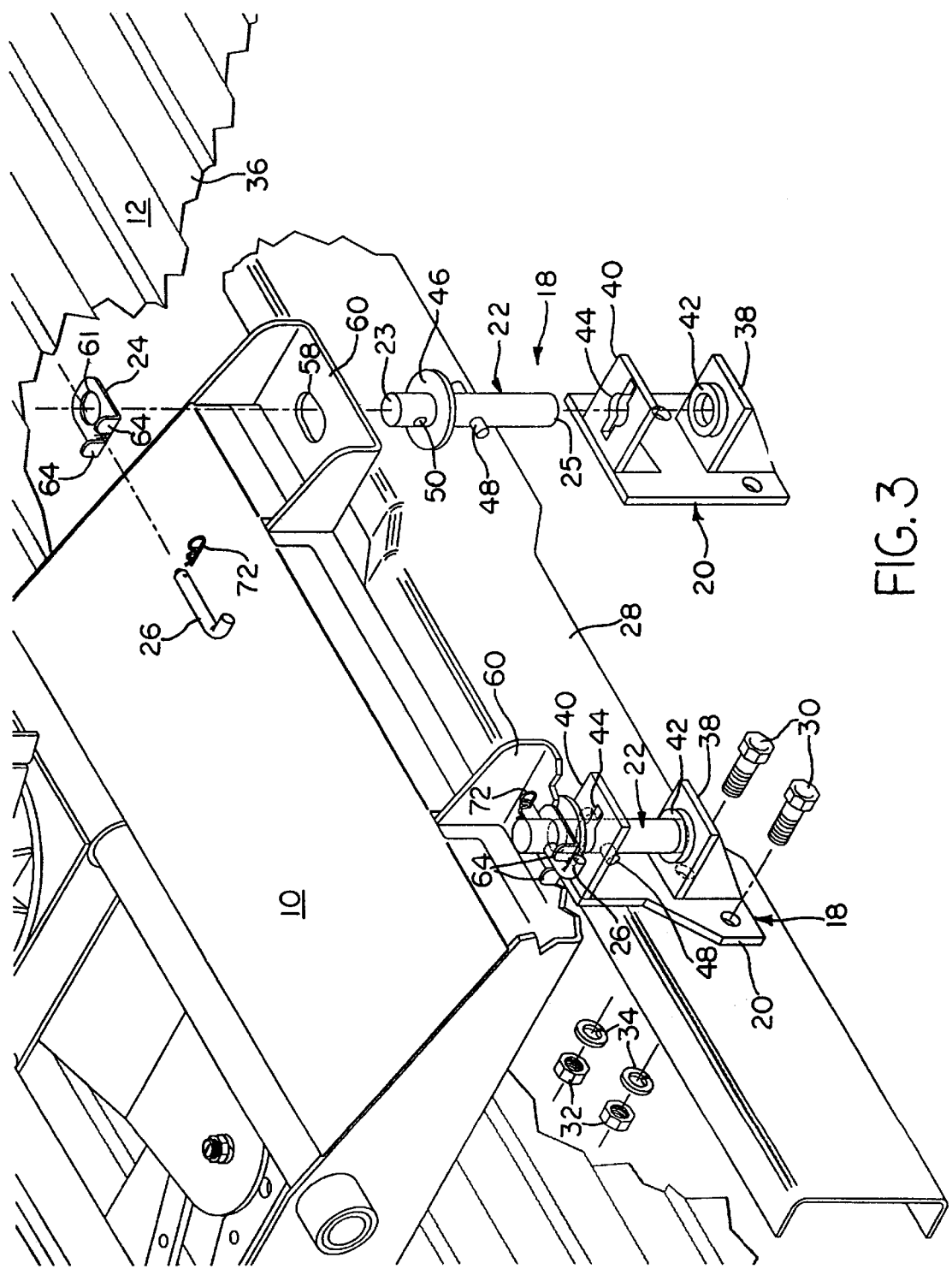
FIG. 3 is a detailed view of a portion of FIG. 2 showing the securement device of this invention in separated or exploded part form.
Figure 4:
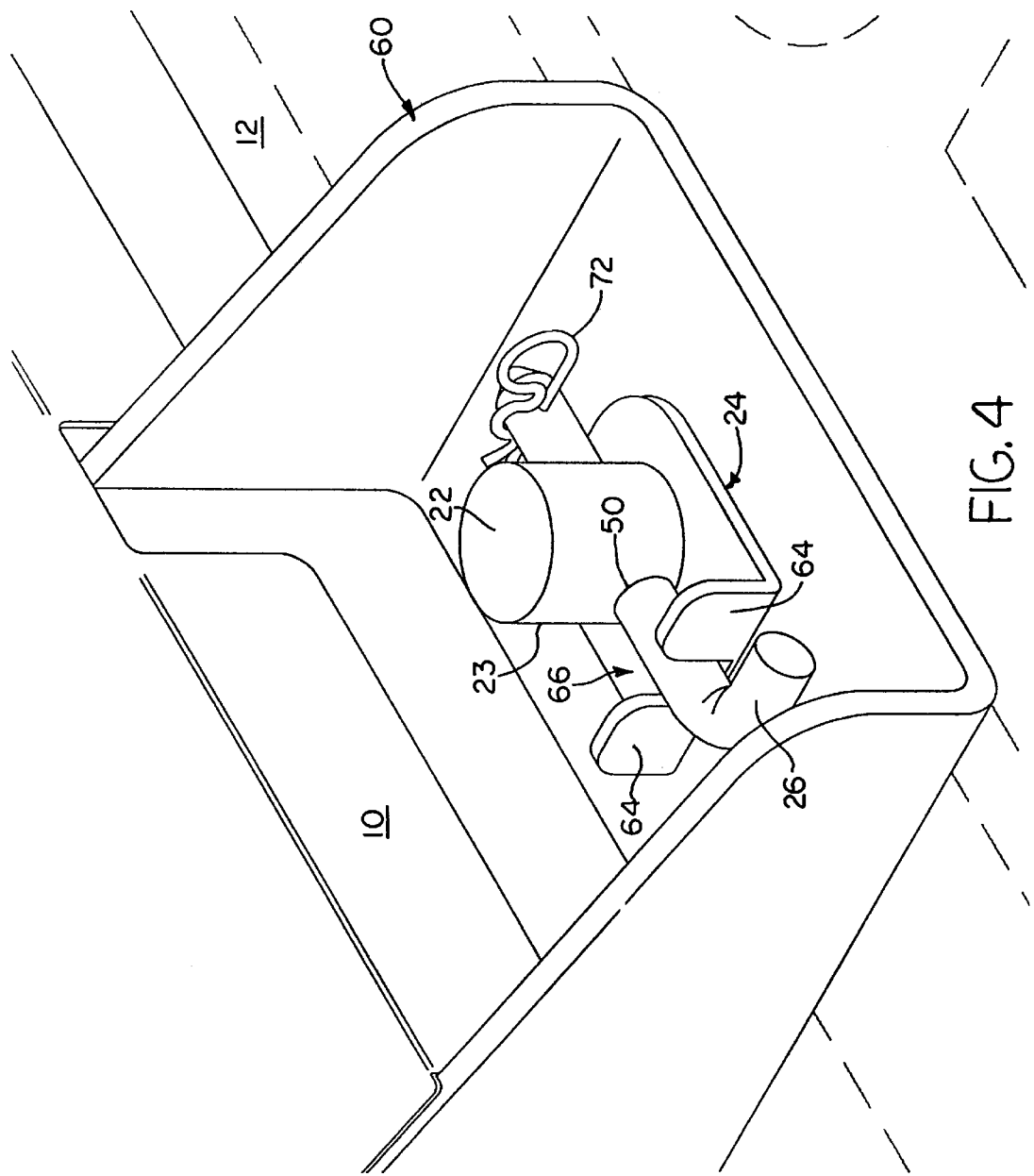
FIG. 4 is a detailed perspective view showing the support post of the securement device of this invention extending through a hitch flange with a keeper part interlocked with the hitch flange and secured to the support post by a lock pin.
Figure 6:
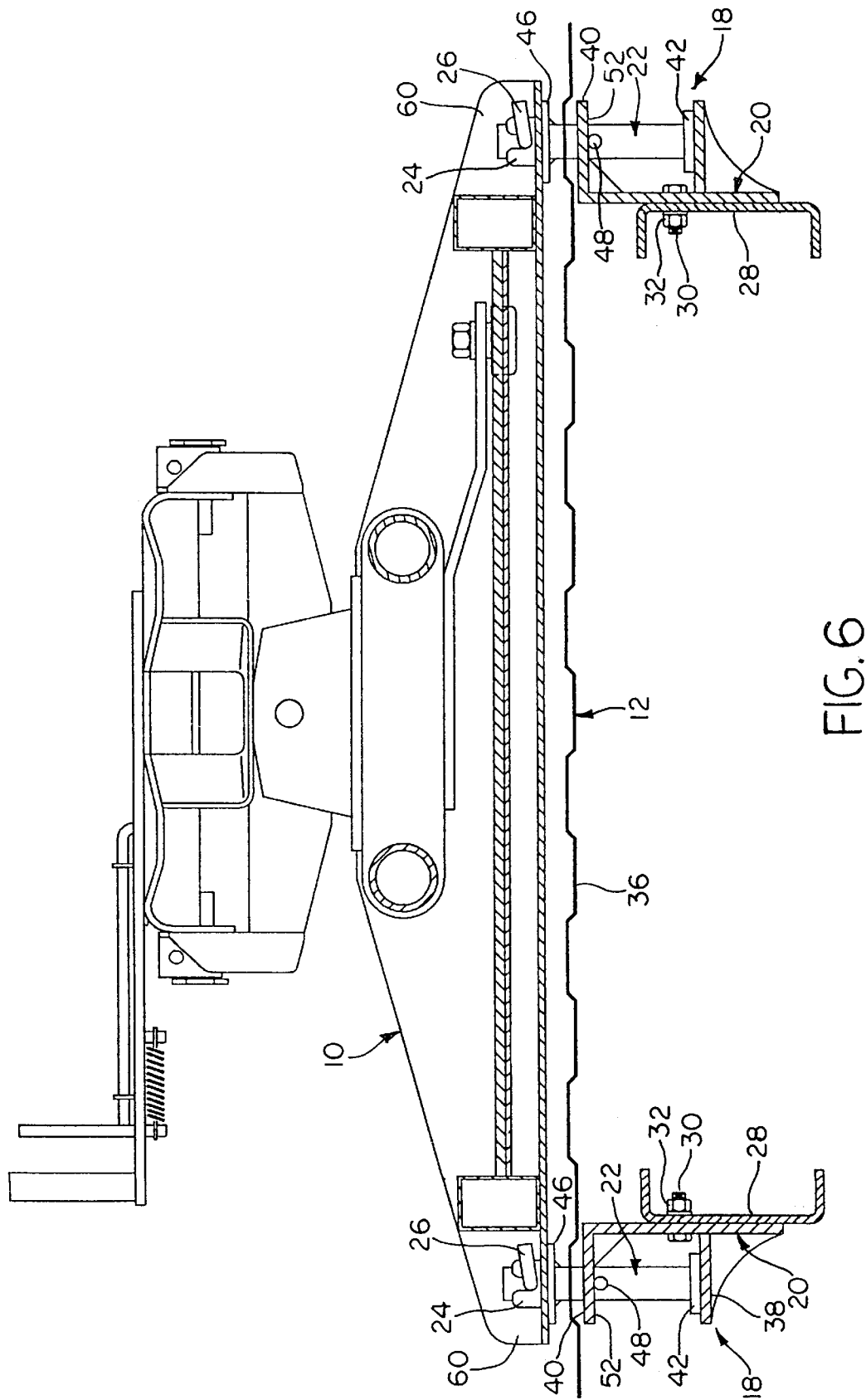
FIG. 6 is a cross sectional view showing the hitch mechanism secured to the truck bed.

A retainer pin 48 extends transversely through post 22 below support collar 46. A bore 50 extends transversely through post 22 at its upper end 23. Bore 50 preferably parallels retainer pin 48. As best illustrated in FIGS. 3 and 6, retainer pin 48 of support post 22 is so located or spaced from lower end 25 of the post that when the post is seated within bracket 20 with its lower end 25 resting upon platform 38 inside anchor collar 42, the pin will be located just slightly below the lower surface 52 of retainer plate 40 of the bracket. In this manner, support post 22 may be inserted downwardly into bracket 20 with retainer pin 48 of the post being aligned with keyhole 44 of the bracket. Once lower end 25 of the post is seated within anchor collar 42 of the bracket, the post may be rotated a quarter turn relative to the bracket causing retainer pin 48 to shift out of alignment with keyhole 44 and to be positioned transversely under retainer plate 40, thereby preventing the post from being raised relative to and separated from the bracket.

Figure 9:
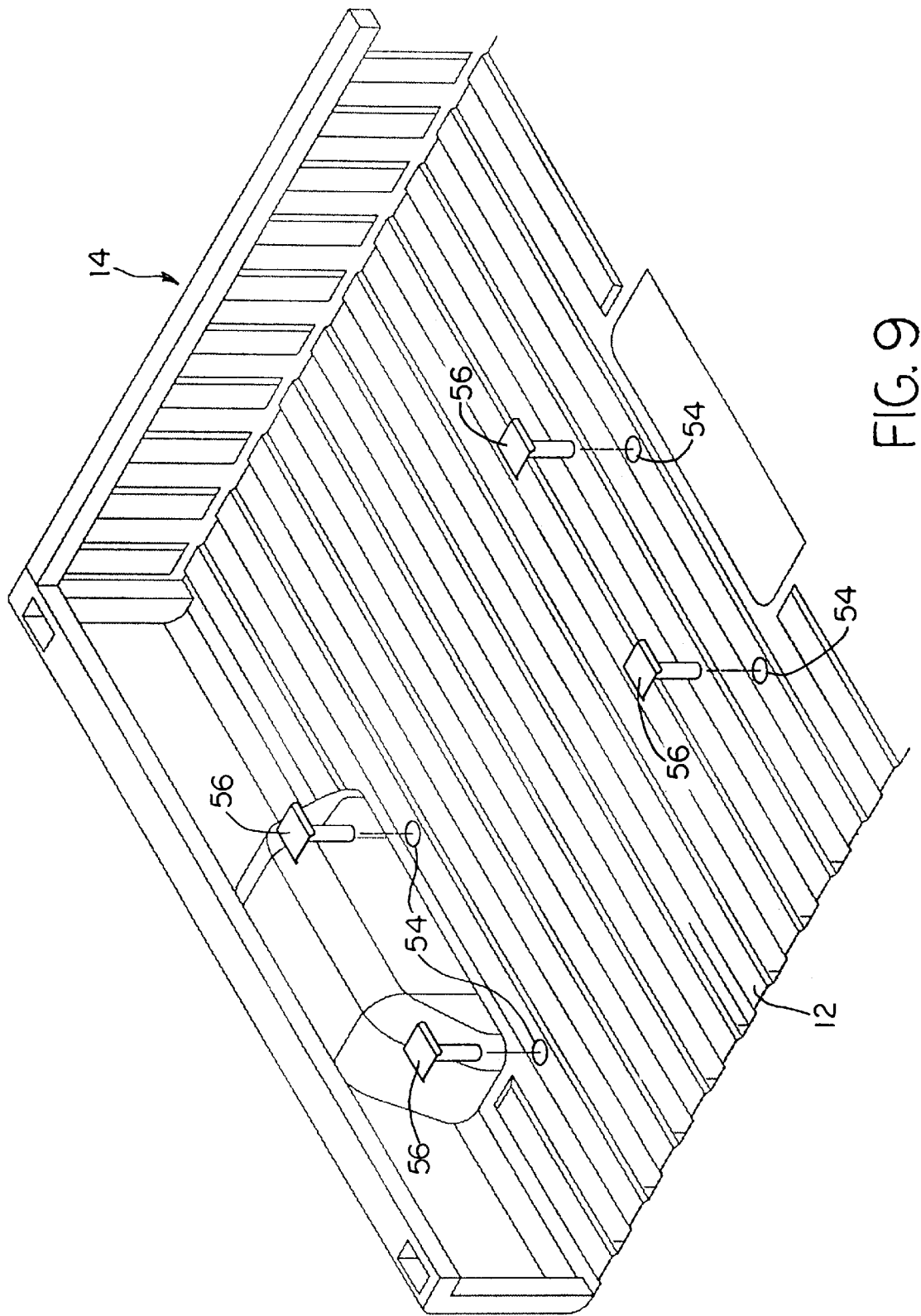
FIG. 9 is a perspective view of the truck bed shown in partial form with the support posts of the securement device removed and plug members readied for insertion into the bed.

Bed 12 of truck 14 is prepared for the mounting of hitch 10 by forming a circular opening 54 above and in alignment with each keyhole 44 in the underlying bracket 20 mounted to a frame rail 28 of the truck. With hitch 10 removed from the bed of the truck and support posts 22 removed from brackets 20, the bed 12 of the truck is unobstructed as best illustrated in FIG. 9. The openings 54 formed in bed 12 may be closed by plugs 56 which are inserted into openings 54 and seated within brackets 20 such as seen in FIG. 10.

Figure 7:
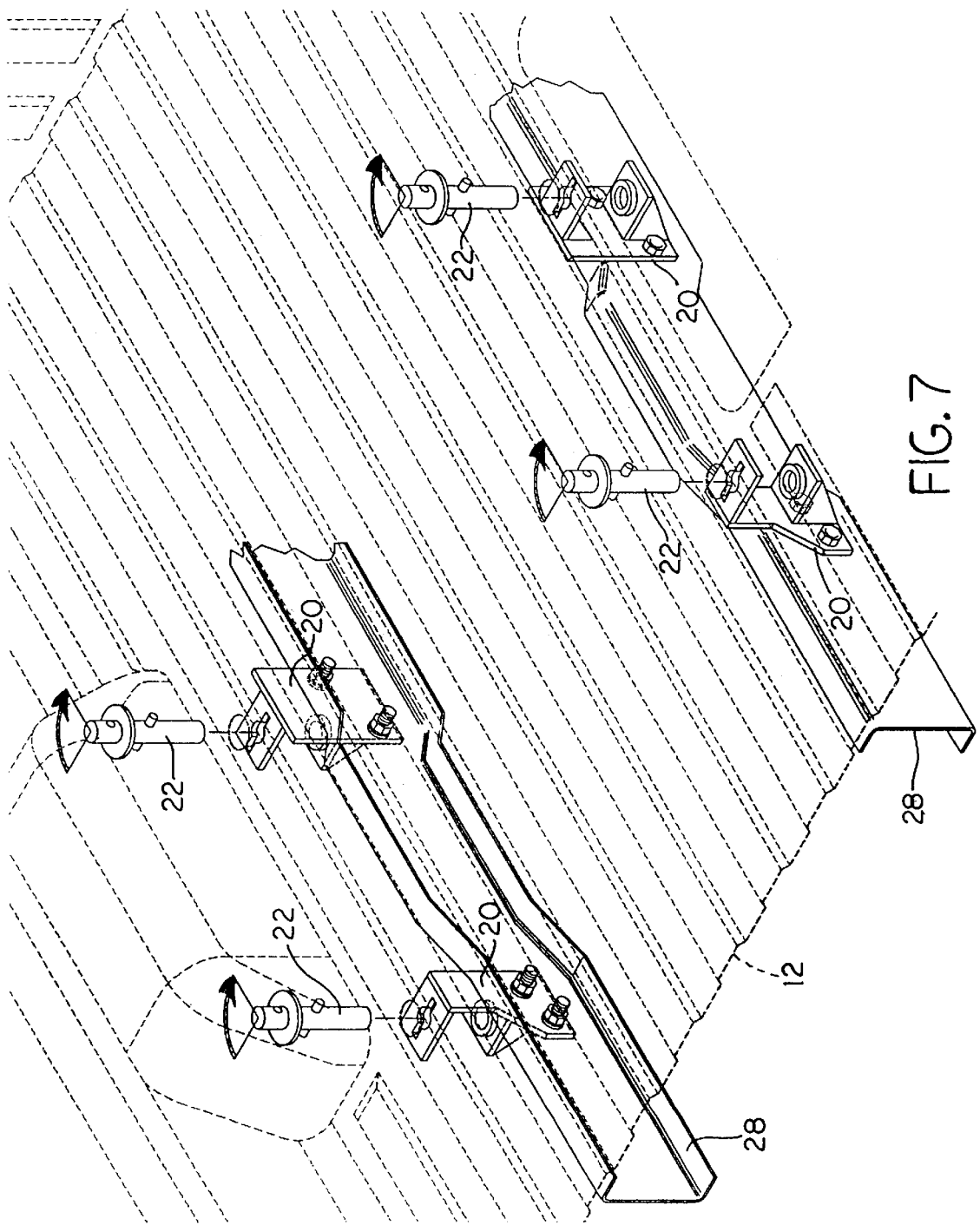
FIG. 7 is a perspective view of the frame members of the vehicle shown in association with the securement devices and the truck bed shown in broken lines.
Figure 8:
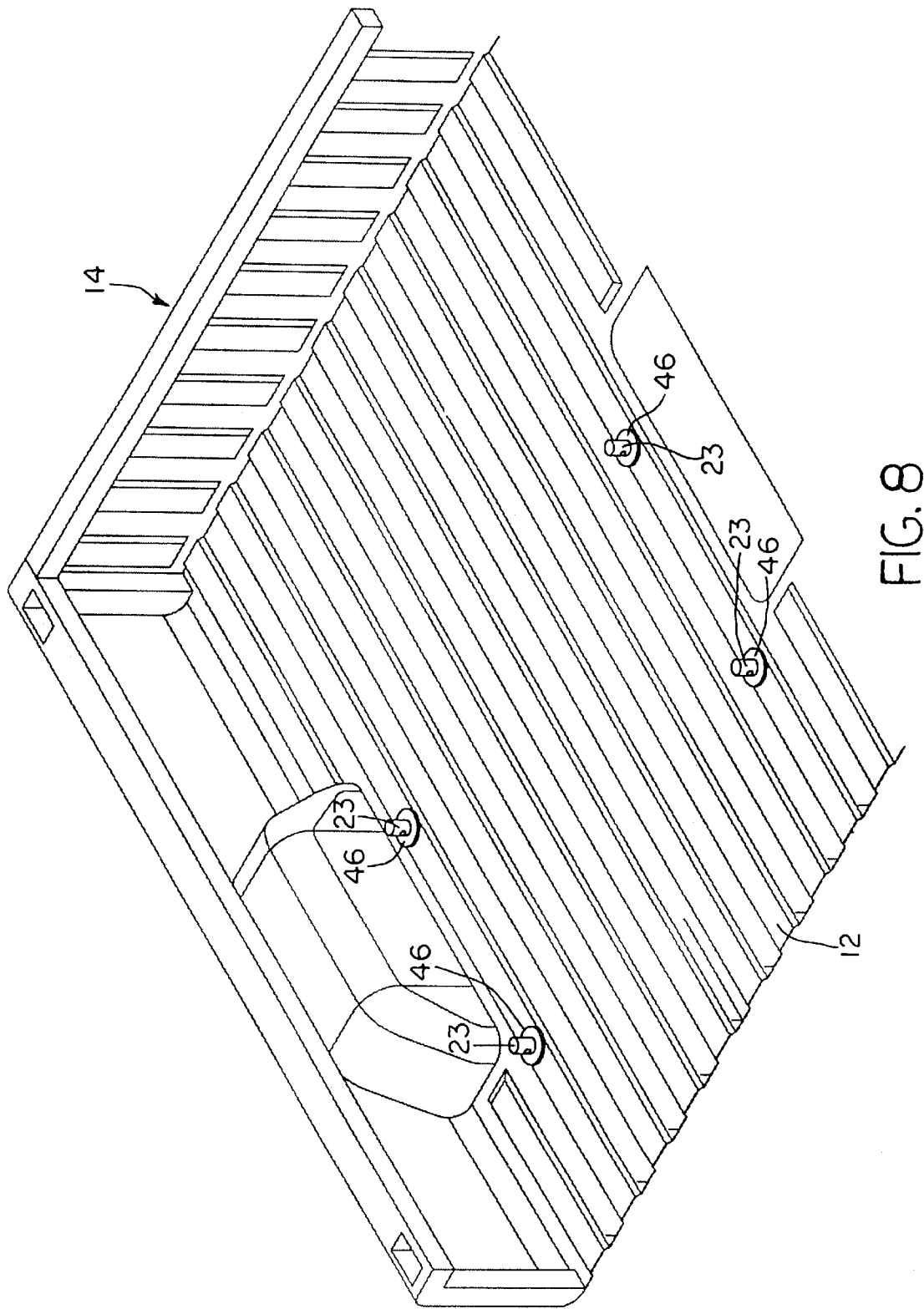
FIG. 8 shows a perspective view of a partial truck bed with the support post of each of the securement devices extending upwardly through the bed for receiving the hitch mechanism.

To secure hitch 10 to bed 12 of truck 14, plugs 56, if used, are pulled from the bed and brackets 20. A support post 22 is then inserted downwardly through each bed opening 54 with its retainer pin 48 aligned with the keyhole 44 of the bracket as previously described. Once each post is seated with its lower end 25 fitted into collar 42 and supported upon platform 38 of the bracket, the post is rotated a quarter of a turn such as illustrated in FIG. 7 to transversely position the retainer pin across the lower surface 52 of retainer plate 40 of the bracket as best illustrated in FIGS. 3 and 6. Once accomplished, the pins assume the position and orientation as illustrated in FIG. 8 with the upper end 23 of each post protruding above bed 12. Collar 46 of each post is preferably located slightly spacedly above bed 12 as best illustrated in FIG. 6. Hitch 10 is then located over bed 12 and is aligned so that each of its flange holes 58 is aligned with a protruding upper end 23 of a post 22. The hitch is then seated upon support collars 46 of the support posts 22 with the upper ends 23 of the posts protruding through flange hole 58 of the hitch.

Figure 5:
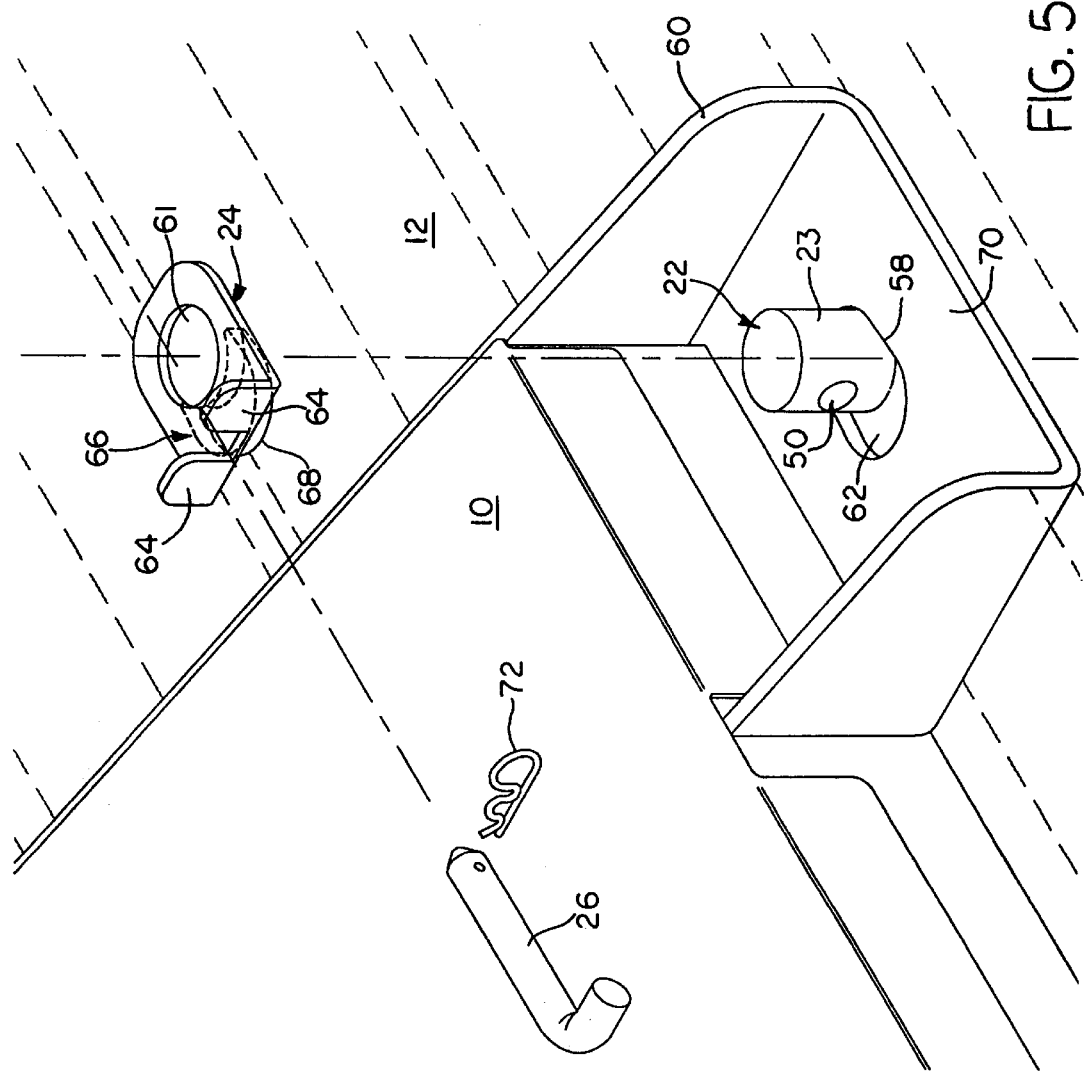
FIG. 5 is a perspective view like FIG. 4 but showing the keeper part and lock pin separated from the support post.

With hitch 10 fitted over the protruding upper ends 23 of posts 22, each mounting flange 60 of the hitch, while being supported upon collar 46 of the engaging pin 22, is located at the level of or just slightly below bore 50 in the post as illustrated in FIG. 5. A keeper 24 which is formed into the general shape of a washer with a center opening 61 is placed over the protruding upper end 23 of the post 22. Flange hole 58 in each hitch flange 60 is oblong with the circular post 22 having a diameter which is only slightly less than the width of the flange hole thereby creating a space 62 between the post and one end of the flange hole. Each keeper 24 includes a pair of upturned tabs 64 forming therebetween a lock pin slot 66. Extending below tabs 64 and the general plane of keeper 24 is a complementary depending protrusion 68. With keeper 24 mounted over post 22 and located against the upper surface 70 of hitch flange 60, protrusion 68 extends into space 62 adjacent to the post to fill the opening so as to prevent movement of the hitch longitudinally relative to the post. When each keeper 24 is so seated upon a hitch flange 60 about upper end 23 of post 22, lock pin slot 66 between tabs 64 of the keeper is aligned with bore 50 in the post upper end. Lock pin 26 is then inserted through bore 50 in the post and lock pin slot 66 of the keeper thus securing the post against rotating movement relative to the bracket as well as the hitch. A cotter pin 72 is inserted through the lead end of each lock pin 26 as it protrudes from post end 23 so as to secure the pin to the post in interlocked fashion with the keeper 24. In this matter, hitch 10 is secured to the truck bed 12 against lateral as well as longitudinal movement and lifting movement.

When it is desired to remove hitch 10 from bed 12 of truck 14, cotter pins 72 are removed from lock pins 26, the lock pins withdrawn from posts 22. Keepers 24 are then removed from over the posts. Hitch 10 is then free to be lifted from the protruding ends of the posts and removed from the truck bed. If it is desired to ready the truck bed for hauling, post 22 can be rotated one quarter of a turn to align the post retainer pins 48 with the keyhole openings 44 in the brackets. This allows the posts to be withdrawn or lifted from the brackets 20. At that time, plugs 56 can be reinserted through the truck bed and seated in the underlying brackets.

The invention is not to be limited to the details above given but may be modified in accordance with the appended claims.

What I claim is:

1. A securement device for attaching a hitch to a vehicle, said vehicle including frame members supporting a bed, said device comprising a bracket for securement to one of said frame members, a removable support post seated upon said bracket with one end of said post adjusted to extend through said bed and said hitch when the hitch is located over said bed, said support post including means interlocking with said bracket upon rotation of the support post relative to the bracket to prevent separation of the support post from the bracket, and a keeper part secured to said support post and adapted to overlie and engage said hitch to prevent said support post from rotating relative to the hitch and bracket.

2. The securement device of claim 1 wherein said bracket includes a receiving part which encloses said support post, said support post including a retainer part interlocking with said receiving part upon rotation of the support post relative to the receiving part.

3. The securement device of claim 2 wherein one end of said receiving part has a slot formed therein, said retainer part of the support post being a pin extending freely through said slot as said support post is seated upon said bracket, said pin being restrictively located from said slot when said support post is so rotated.

4. The securement device of claim 3 wherein said receiving part of said bracket includes a platform located at an end opposite said slot, said opposite end of said receiving part includes a collar spaced above said platform, said support post extending through said collar with its lower end abutting said platform.

5. The securement device of claim 1 wherein said keeper fits about said support post and includes a part interlocking with said hitch when the hitch is located over said bed.

6. The securement device of claim 5 wherein said hitch includes a mounting opening, said support post one end and said keeper part fitted into said hitch opening when the hitch is located over said truck bed.

7. The securement device of claim 5 and a lock pin extending through said support post one end and interlocking with said keeper.

8. The securement device of claim 1 wherein said support post includes a transversely oriented support part at its said one end, said support part adapted to engage and hold said hitch spacedly above said truck bed.

* * * * *